Patented Nov. 6, 1923.

1,472,951

UNITED STATES PATENT OFFICE.

WILLIAM VANDYKE WATSON, OF SAN DIEGO, CALIFORNIA, ASSIGNOR OF ONE-HALF TO SAN DIEGO CONSOLIDATED GAS AND ELECTRIC COMPANY, OF SAN DIEGO, CALIFORNIA, A CORPORATION OF CALIFORNIA.

PLASTIC COMPOSITION AND METHOD FOR MAKING THE SAME.

No Drawing.  Application filed December 27, 1921.  Serial No. 525,142.

*To all whom it may concern:*

Be it known that I, WILLIAM V. WATSON, a citizen of the United States, residing at San Diego, in the county of San Diego and State of California, have invented a certain new and useful Plastic Composition and Method for Making the Same, of which the following is a specification.

My invention relates to a plastic composition and the method for making the same, more particularly adapted for use as paving or road or floor surfacing; or for the manufacture of pipe such as sewer, water or gas pipe; or for roofing or the protection of buildings; or as a protective covering for wood, paper, iron or other metal or concrete either as a plastic surface or a paint or for lute for plumbers in the form of hot paint and the objects of my invention are: first, to provide a novel plastic composition of the class described for the purposes set forth; second, to provide a composition for such purposes which is composed principally of gas plant refuse and by-products of very little value otherwise; third, to provide a composition of this class which is very durable, strong, is not brittle or liable to chip or break, is relatively resistant to the action of corrosive elements such as water, gases, acids, alkalies, oils, salts, and the attacks of animals, insects and fungi and yet is not itself corrosive in action upon the substance which it is designed to protect; fourth, to provide a composition of this class and method of making the same which is very easily and economically compounded and applied, and fifth, to provide a composition and method which is a modification from my application filed September 9, 1920, Serial Number 409,061, now Patent No. 1,398,613.

With these and other objects in view as will appear hereinafter my invention consists of the certain novel plastic composition and the certain novel method of making plastic composition as will be hereinafter described in detail and particularly set forth in the appended claims.

My invention consists in preparing a composition which is composed principally of worthless refuse from gas plants as follows: gas plant carbon, finely divided carbon, lamp black, coal gas tar and other tar produced from the manufacture of heating and illuminating gas, excepting oil and water gas tar, which has been covered in my previous application for plastic composition and method for making the same, filed September 9, 1920, Serial Number 409,061, and allowed May 7, 1921, now Patent No. 1,398,613 refuse sponge from gas plant purifiers which contains from thirty to sixty per cent sulphur in the form of sulphides, etc., and river or beach sand, broken rock or gravel.

It will be noted that applicant has found by experimentation that briquette dust, usually termed lamp black may be eliminated and a reasonably good composition produced. However, for some purposes, it is preferred to include some lamp black.

It will also be noted that applicant has found by experimentation that sulphur in any form may be used instead of that in refuse sponge from gas plant purifiers which contains from forty to sixty per cent sulphur in the form of sulphides. However, it is preferred to use the refuse sponge from the gas plant purifier.

The refuse from gas plant purifiers consists of a sponge which is made as follows: By taking wood shavings and adding sulphate of iron, slacked lime and oxidized iron filings and turnings to form iron oxide by weathering, which absorbs and collects all the poisonous, tarry oils, and sulphur from the sulphuretted hydrogen, naphthalene and other antiseptic and poisonous combinations in crude burning gas.

This refuse discarded from the purifiers of gas plants contains approximately from thirty to sixty per cent of sulphur as sulphide, five per cent of naphthalene and varying quantities of tar containing ammoniacal liquor and naphtha, carbolic oil, creosote oil, anthracene, pitch and asphalt, also traces of poisonous Prussian blue and cyanide combinations.

In preparing the composition I prefer to use the ingredients in about the following proportions, dry weight; gas plant purifier sponge, one part; sand or sand and gravel, one part; coal gas tar, one part; and lamp black, one-half part.

These ingredients are mixed as follows: After partial or complete dehydration of the coal gas tar the materials are heated together, to between two hundred and four hundred degrees Fahrenheit, then while hot it may be utilized for pavement, roofing, floors, walks etc.; or in the manufacture of pipe such as sewer, gas or water pipe; or as a protective covering either thick as a plastic compound or thin as a paint applied hot or cold for wood, paper, metal, concrete, masonry or other substance requiring protection from the elements or the action of corrosive gases, liquids, or solids, or the depredation of animals, insects, marine life or fungus.

This composition may be dehydrated and allowed to cool and reheated for final use, smoothed, stamped or rolled as desired. It may be mixed with suitable vehicles, diluents or fillers and used hot or cold as a paint.

The sulphur, naphthalene, cyanide, and other gas constituents in the gas purifier sponge combine at sulphur fusion between one hundred and two hundred degrees centigrade into a plastic mass that results in a modified composition similar to the modifications produced in rubber by vulcanization, producing a plastic composition of very high tensile and compressive strength, the degree of hardness being dependent upon the moisture contents of the material and other variations in the proportions of constituent materials.

It will be here noted that it is preferred to prepare the composition with the four ingredients as hereinbefore stated. However, experiment discloses as herebefore stated that a plastic composition which might be practical though not so effective may be produced without the use of the lamp black and also that sulphur derived from other sources than purifier sponge may be used and it is therefore desired to include in the application the composition without the use of the lamp black and the use of sulphur in other forms than in the purifier sponge.

Having thus described my invention what I claim as new and desire to secure by Letters Patent is:

1. A plastic composition, comprising refuse sponge from gas purifiers, sand, coal gas tar, and lamp black.

2. A plastic composition, comprising refuse sponge from gas purifiers, one part, sand, one part, coal gas tar, one part, and lamp black, one-half part.

3. A plastic composition, comprising refuse sponge from gas purifiers, fine particles of stone and coal gas tar.

4. A plastic composition, comprising refuse sponge from gas purifiers, fine particles of stone, and coal gas tar in substantially equal proportions.

5. A plastic composition comprising refuse sponge from gas purifier, sand, coal gas tar, and finely divided carbon.

6. The herein described method of preparing plastic composition consisting in mixing refuse sponge from gas purifiers, sand and gravel, coal gas tar, and lamp black, thoroughly agitating the same, dewatering and fluxing by heating to about two hundred to four hundred degrees Fahrenheit.

7. The herein described method of preparing plastic composition consisting in mixing refuse sponge from gas purifiers, sand, gravel, coal gas tar, lamp black, thoroughly agitating the same, heating, dewatering, then allowing it to cool, reheating to about two hundred to four hundred degrees Fahrenheit for final use.

8. The herein described method of preparing plastic composition and the like, consisting in mixing refuse sponge from gas purifiers, sand and gravel, coal gas tar, thoroughly agitating the same, dewatering and fluxing by heating to about two hundred to four hundred degrees Fahrenheit.

9. The herein described method of preparing plastic composition consisting in mixing refuse sponge from gas purifiers, coal gas tar, lamp black, thoroughly agitating the same, heating, dewatering, then allowing it to cool, reheating to about two hundred to four hundred degrees Fahrenheit for final use.

10. The herein described method of preparing plastic composition consisting in mixing refuse sponge from gas purifiers, coal gas tar, lamp black, thoroughly agitating the same, heating, dewatering, then allowing it to cool.

In testimony whereof, I have hereunto set my hand at San Diego California this 15 day of December 1921.

WILLIAM VANDYKE WATSON.